(12) United States Patent
Epstein (10) Patent No.: US 11,691,771 B1
(45) Date of Patent: Jul. 4, 2023

(54) HYGIENIC CONVEYING CHAIN CLAMP USED IN A HORIZONTAL FORM FILL AND SEAL PACKAGING MACHINE

(71) Applicant: Moshe Epstein, Northbrook, IL (US)

(72) Inventor: Moshe Epstein, Northbrook, IL (US)

( * ) Notice: Subject to any disclaimer, the term of this patent is extended or adjusted under 35 U.S.C. 154(b) by 0 days.

(21) Appl. No.: 18/116,818

(22) Filed: Mar. 4, 2023

Related U.S. Application Data

(60) Provisional application No. 63/315,727, filed on Mar. 2, 2022.

(51) Int. Cl.
*B65B 41/14* (2006.01)
*B65G 17/32* (2006.01)
*B65B 9/06* (2012.01)

(52) U.S. Cl.
CPC .............. *B65B 41/14* (2013.01); *B65B 9/06* (2013.01); *B65G 17/323* (2013.01); *B65G 2207/26* (2013.01)

(58) Field of Classification Search
CPC B65B 41/14; B65B 9/06; B65B 9/063; B65B 9/067; B65B 9/08; B65B 9/087; B65B 9/093; B65G 17/323; B65G 2207/26; B65G 17/12; B66B 9/073
See application file for complete search history.

(56) References Cited

U.S. PATENT DOCUMENTS

| | | | | |
|---|---|---|---|---|
| 4,397,411 A * | 8/1983 | Vetter | ............... | B65H 20/16 53/389.5 |
| 4,826,065 A * | 5/1989 | Natterer | ............... | B65B 41/14 53/389.5 |
| 4,915,283 A * | 4/1990 | Buchko | ............... | B65B 41/14 226/173 |
| 5,517,805 A * | 5/1996 | Epstein | ............... | B65B 65/02 53/579 |
| 5,702,044 A * | 12/1997 | Christmann | ............... | B65B 41/14 403/375 |
| 5,791,453 A * | 8/1998 | Schmits | ............... | H05K 13/0061 198/817 |
| 7,922,614 B2 * | 4/2011 | Ruzic | ............... | F16G 13/18 474/212 |
| 7,938,875 B2 * | 5/2011 | Son | ............... | F16K 17/0493 55/445 |
| 8,156,721 B1 * | 4/2012 | Epstein | ............... | B65B 41/12 53/574 |
| 9,051,125 B2 * | 6/2015 | Kurz | ............... | B65H 20/16 |

* cited by examiner

*Primary Examiner* — Mark A Deuble
(74) *Attorney, Agent, or Firm* — Steven Ivy P.C.

(57) ABSTRACT

Disclosed is a hygienic clamp attachable to conveying chains used in horizontal, form, fill, and seal, packaging machines. The clamp is used for holding the packing film, which is conveyed between various work stations of the machine. The clamp assembly comprises of three components: stanchion, gripper, spring. The clamp eliminates the use of a rivet, previously used for holding the spring, and guiding vertical moment of the gripper during the clamping process. The hygienic clamp replaces the rivet with a mortise and tenon connection. The mortise is located inside the stanchion and the tenent is located inside the gripper. The hygienic clamp also incorporates a ridge (attached to the stanchion) which interacts with the tenon (protruding from the gripper). The interaction between these two parts enables delayed closure of the clamp, independent of the cam's actions, which functions as the primary opening and closing mechanism for the hygienic clamp.

5 Claims, 9 Drawing Sheets

PRIOR ART

PRESENT INVENTION

100
HYGIENIC CONVEYING CHAIN CLAMP USED IN
A HORIZONTAL FORM FILL AND SEAL
PACKAGING MACHINE

HYGIENIC CONVEYING CHAIN CLAMP USED IN A HORIZONTAL FORM FILL AND SEAL PACKAGING MACHINE

FIELD OF THE INVENTION

The present invention relates to the general field of packaging machines, and tooling used in automated, horizontal, packaging machines.

BACKGROUND OF THE INVENTION

Horizontal, form, fill and seal, packaging machines are designed to package various types of food. More specifically, the packaging is built around a product placed inside one of the work stations' of the machine. The machine functions by unrolling, and conveying the packaging film through various work stations, which in sequence, fill, seal, and cut the packing to the predetermined size and configuration.

The horizontal, form, fill and seal, packaging machines utilize a wide variety of clamps to hold the packaging film that is conveyed, via a chain, between various work stations of the machine. Currently, the designs, and ultimately the functionality of these clamps focuses on accurate, firm clamping and reliable holding of the packaging film. However, all pre-existing clamps have one major flaw—lack of cleanliness, which results in buildup in poisonous food bacteria. Moreover, the cumbersome design of the pre-existing clamps, makes the process of cleaning the convening chain, configured to hold vast amounts of said clamps, superbly tedious and ineffective. The cleaning process is largely ineffective, because the pre-existing designs of the clamps created too many small nooks and crannies used by the bacterial to hide.

More specifically, the construction of the pre-existing clamp designs utilizes a rivet, held by the gripper, and designed to engage the stanchion during the process of clamping the packaging film. It is the employment of the rivet that creates small crevices which are impossible to clean, allowing the bacteria to flourish. The present invention eliminates the use of the rivet. The newly-designed clamp, replaces the rivet with a tenon, disposed inside the gripper, formed by punching a cavity in the top wall of the gripper. To accommodate the gripper's tenon, the stanchion was redesigned to include a mortise, made to slideably accept the gripper's tenon, designed to guide the two main components, the stanchion and gripper, during the clamping of the packaging film. This new configuration allows for easy access to all crevices of the aforementioned components, making the process of cleaning, and eliminating the bacteria, virtually effortless.

BRIEF SUMMARY OF THE INVENTION

The following information is intended to be a brief summary of the invention, and as such, said information shall not be used as the means of limiting the scope of the invention:

The present invention discloses hygienic clamp ("hygienic conveying chain clamp") attachable to a conveying chain, used in horizontal, form, fill, and seal, packaging machine ("food packaging machine"). The hygienic conveying chain clamp is used for holding the packing film, which is conveyed between various work stations of the food packaging machine. The hygienic conveying chain clamp comprises of three primary components (1) stanchion, (2) gripper, and (3) spring.

The stanchion is attached to the conveyor chain using a plurality of dowel pins, which allows for quick detachment of the hygienic conveying chain clamp from the conveying chain. The stanchion comprises of the following parts: back wall, two side walls, two guide pins, skid surface, groove, mortise, ridge, and a plurality of dowels. The gripper comprises of the following parts: top wall, tenon, tenon opening, two guide walls, two channels, clamp edge, and spring tab.

The hygienic conveying chain clamp opens when engaged by the cam (independently mounted to the machine), causing vertical and pivotal movement of the gripper allowing the packaging film to access and slide over the skid surface. When the cam is disengaged (no longer pushing the gripper upwards), the tenon will be butting against the ridge, thereby keeping the hygienic conveying chain clamp in open position, until engaged by the activating member (a block independently mounted to the machine), hits the gripper, causing the tenon to jump over the ridge and enter the mortise.

The mortise to tenon connection acts as a guide for the two interacting components, the stanchion and the gripper. Specifically, the mortise/tenon connection is guiding the clamp edge into the ridge, and by using spring-power the packaging film is clamped between the stanchion and the gripper, enabling the conveying chain to convey the packaging film between the plurality of work stations of the horizontal form fill and seal packaging machine.

BRIEF DESCRIPTION OF THE DRAWINGS

The components shown in the drawings are not to scale. In the interest of clarity, some of the components might be shown in a generalized form and could be identified utilizing commercial designations. All components, including its essential features, have been assigned reference numbers that are utilized consistently throughout the descriptive process outlined herein.

DESCRIPTIVE KEY

Hygienic Conveying Chain Clamp Used in a Horizontal Form Fill and Seal Packaging Machine ("hygienic conveying chain clamp").
100—hygienic conveying chain clamp
   110—stanchion
   111—back wall
   112—two side walls
   113—two guide pins
   114—skid surface
   115—groove
   116—mortise
   117—ridge
   118—plurality of dowels
   120—gripper
   121—top wall
   122—tenon
   123—tenon opening
   124—two guide walls
   125—two channels
   126—clamp edge
   127—spring tab
   130—spring
200—activating member (stationary block)
300—cam
400—horizontal, form, fill and seal, packaging machine
   401—packaging film
   402—conveying chain
   403—plurality of work stations

DETAILED DESCRIPTION OF THE PREFERRED EMBODIMENT

Figure 1:
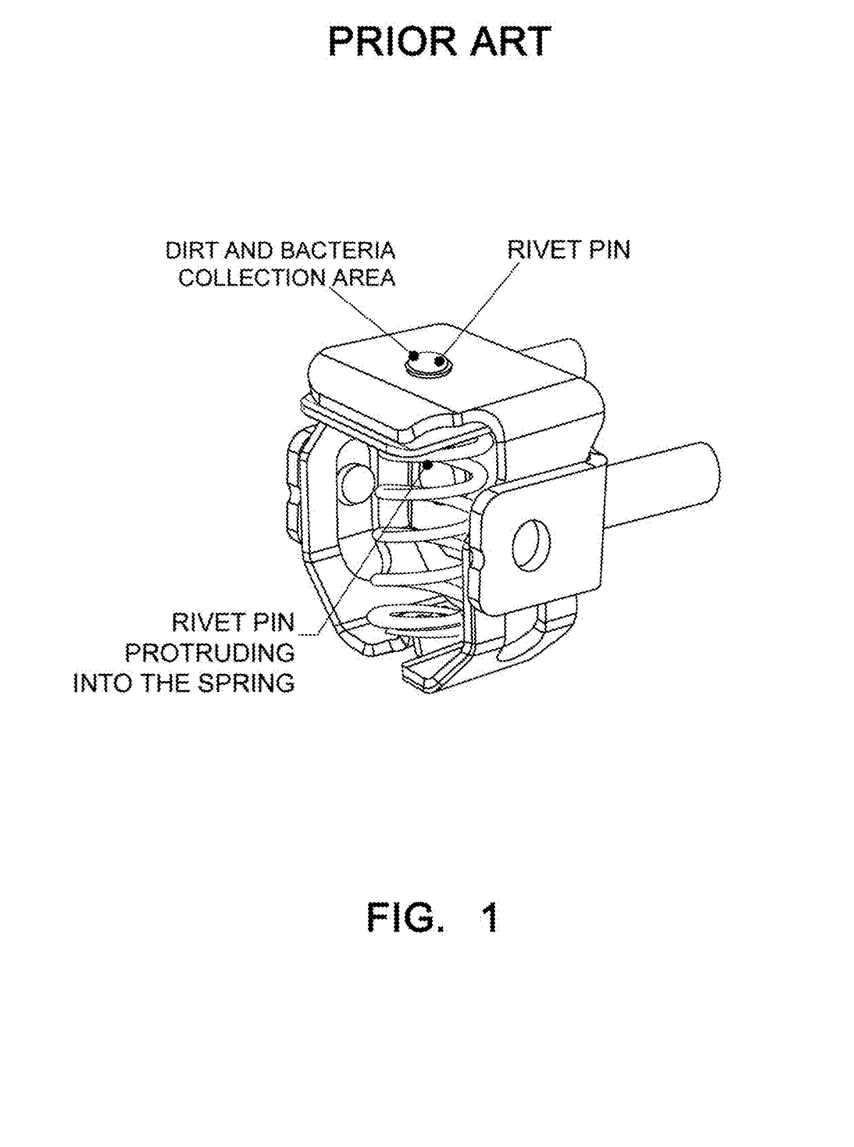
FIG. 1 is a perspective view of a pre-existing clamp assembly (prior art), comprising of three primarily components, showing the area (rivet pin) responsible for collection of toxic bacteria; in accordance with an exemplary embodiment of the present invention.
Figure 2:
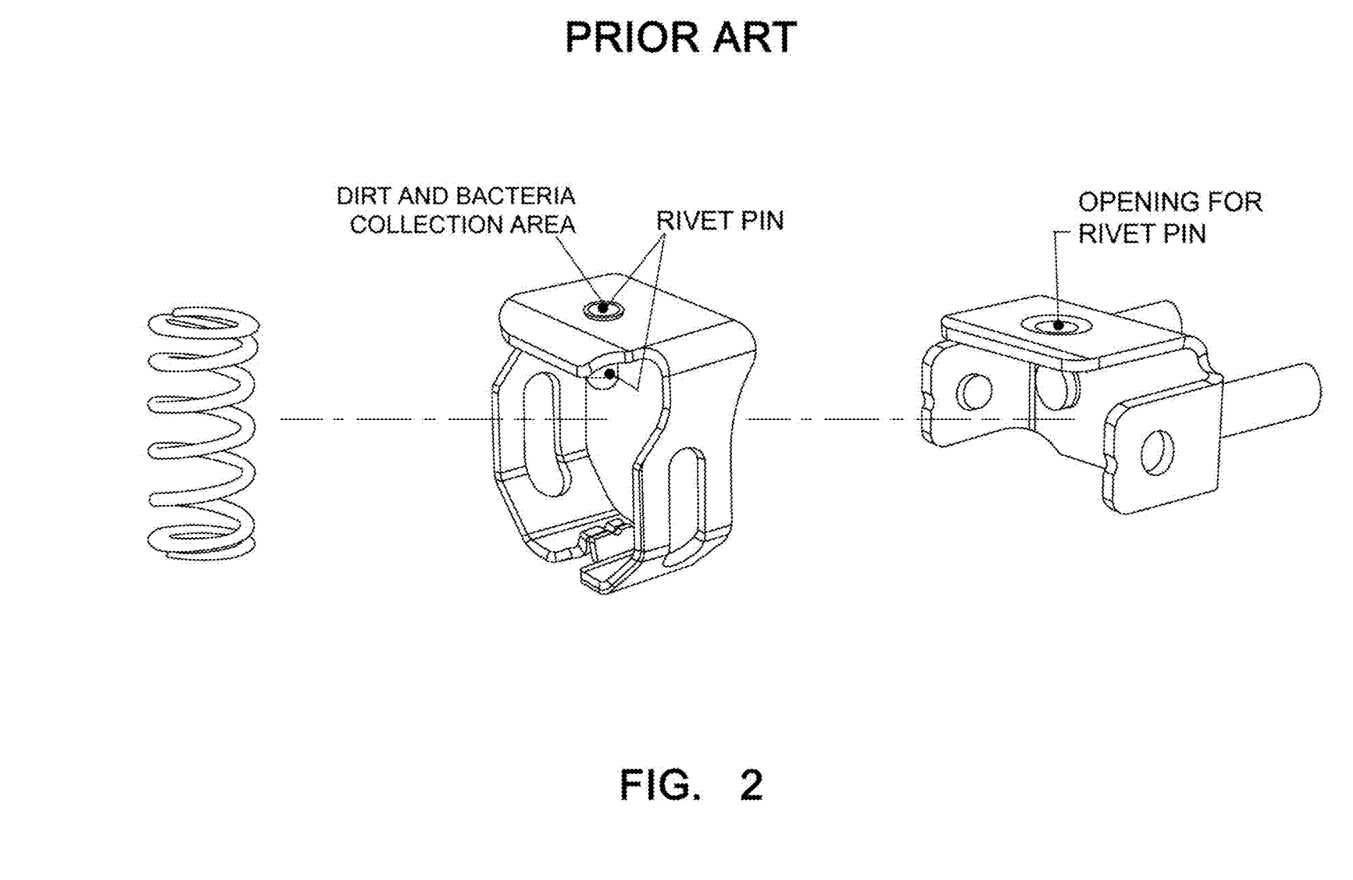
FIG. 2 is an exploded view of the pre-existing clamp assembly, designed to show the individual component of the assembly (stanchion, gripper, spring), and locations of both the rivet and the rivet hole used for both guiding the stanchion's vertical movement and holding the spring in place; in accordance with an exemplary embodiment of the present invention.
Figure 3:
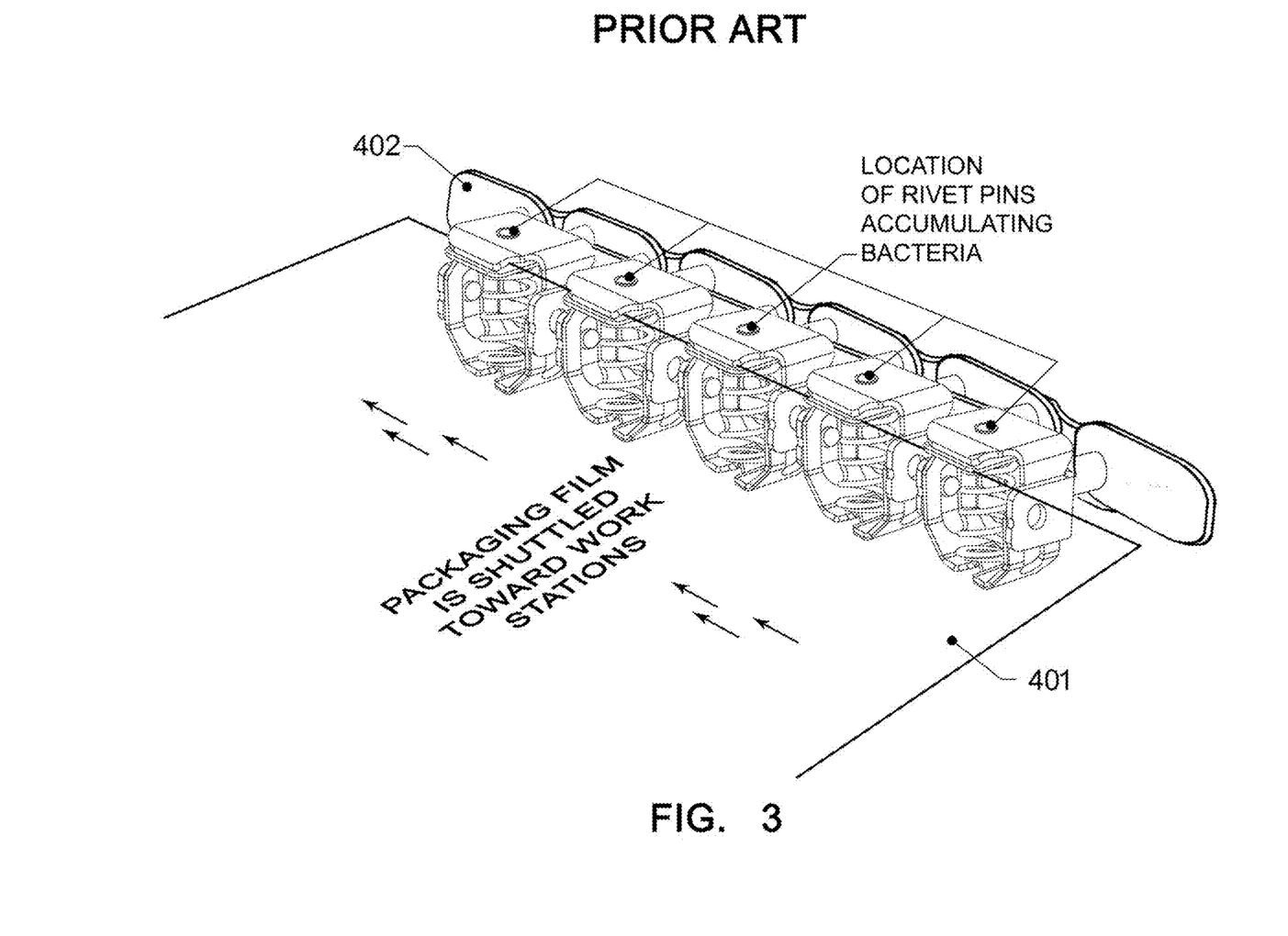
FIG. 3 is a perspective view of a chain assembly incorporating a multitude of pre-existing clamps, designed to show the positioning of the packaging film in relation of the clamps, during the process of conveyed the packaging film toward various work stations of the machine; in accordance with an exemplary embodiment of the present invention.
Figure 4:
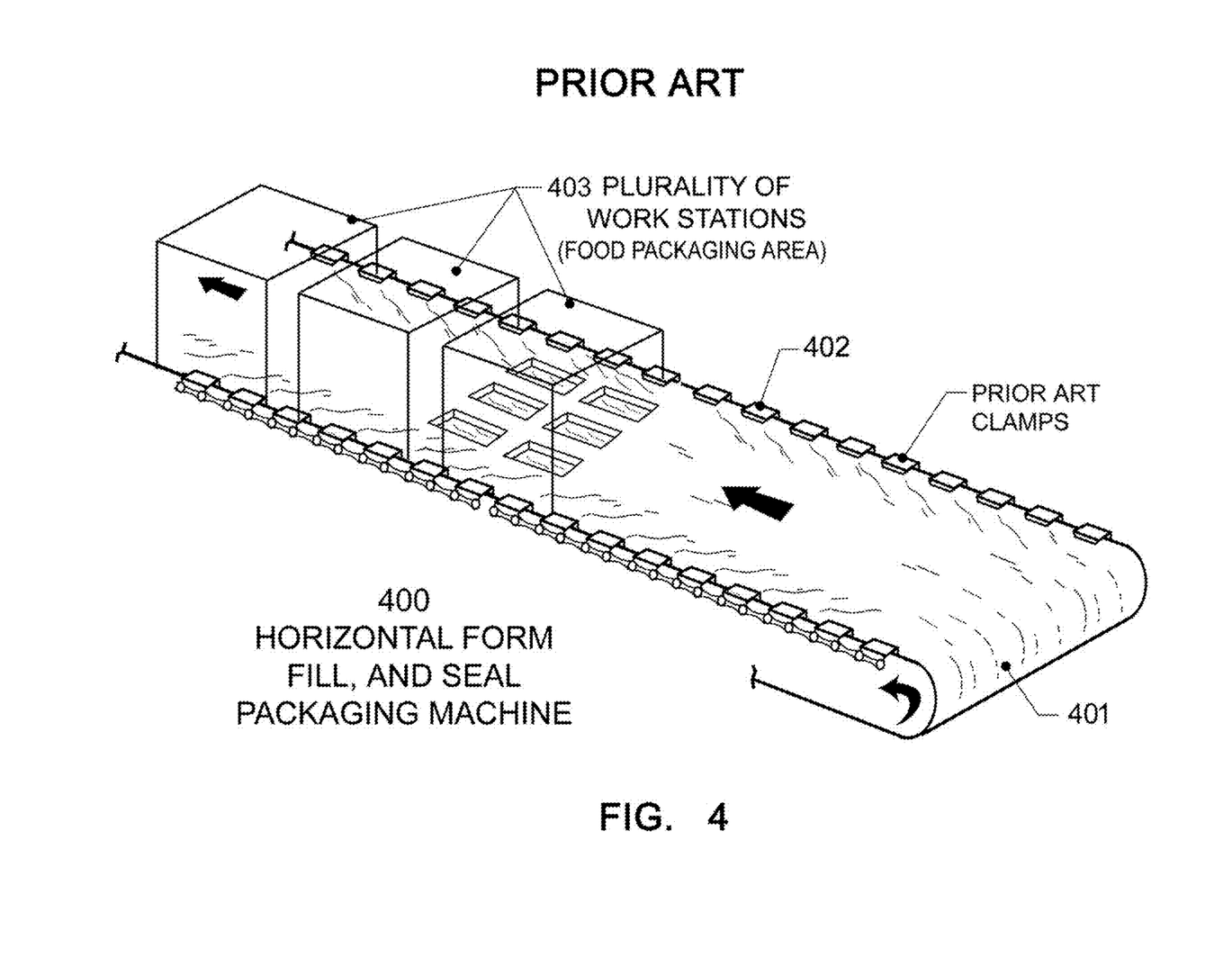
FIG. 4 is a perspective view of a conveyor system utilized in a horizontal form fill and seal packaging machine, designed to show the positioning of various work stations, and the conveying chain, incorporating a multitude of pre-existing clamps; in accordance with an exemplary embodiment of the present invention.
Figure 5:
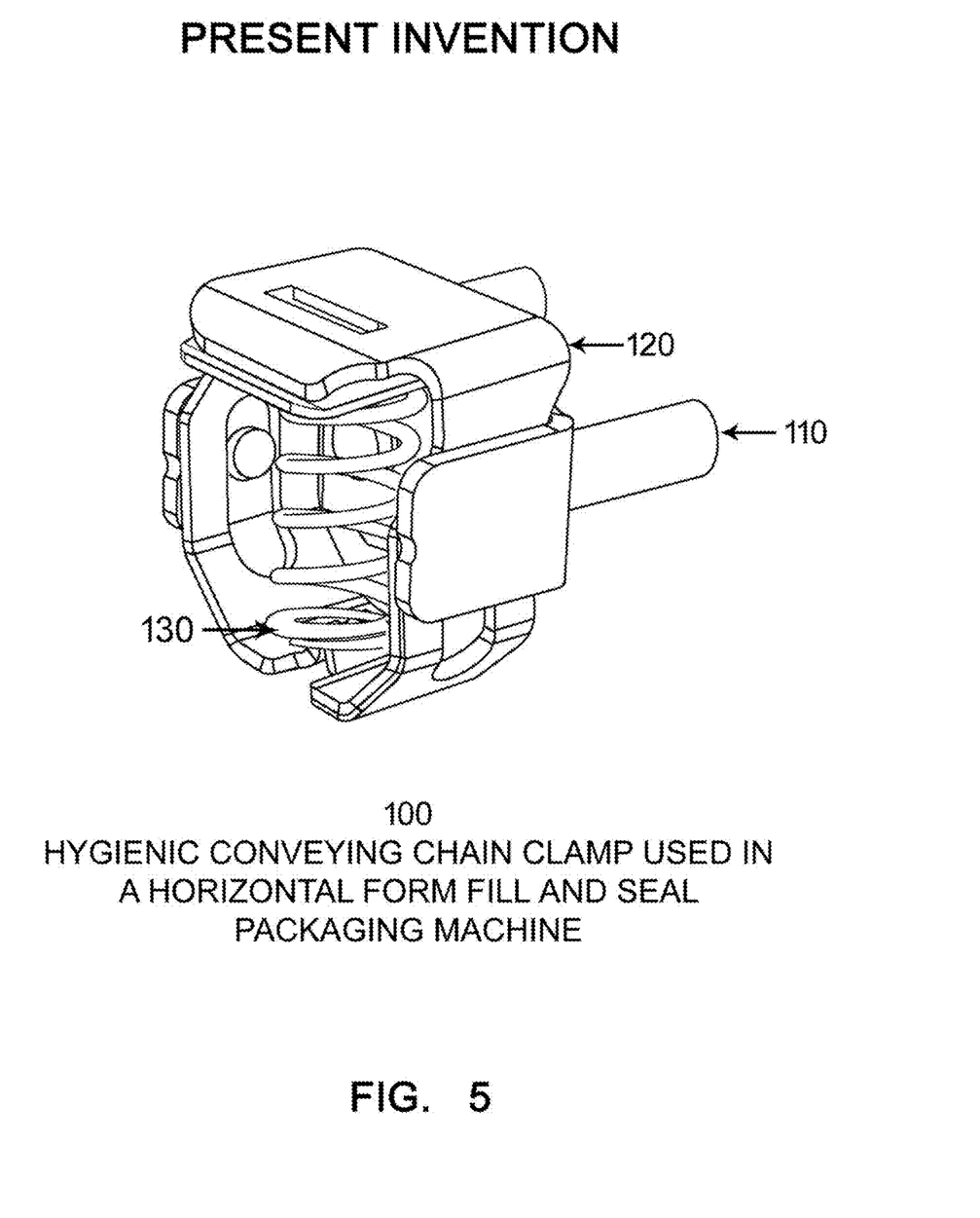
FIG. 5 is a perspective view of the present invention, hygienic clamp for conveying chains used in horizontal, form, fill, and seal, packaging machine, shown fully assembled; in accordance with an exemplary embodiment of the present invention.

The following description references to the above-defined drawings and represents only an exemplary embodiment of the invention. It is foreseeable, and recognizable by those skilled in the art, that various modifications and/or substitutions to the invention could be implemented without departing from the scope and the character of the invention:

As shown in FIG. 5, the present invention is a hygienic clamp ("hygienic conveying chain clamp") 100 attachable to a conveying chain 402, used in horizontal, form, fill, and seal, packaging machine ("food packaging machine") 400, shown in FIGS. 3 and 4.

Figure 6:
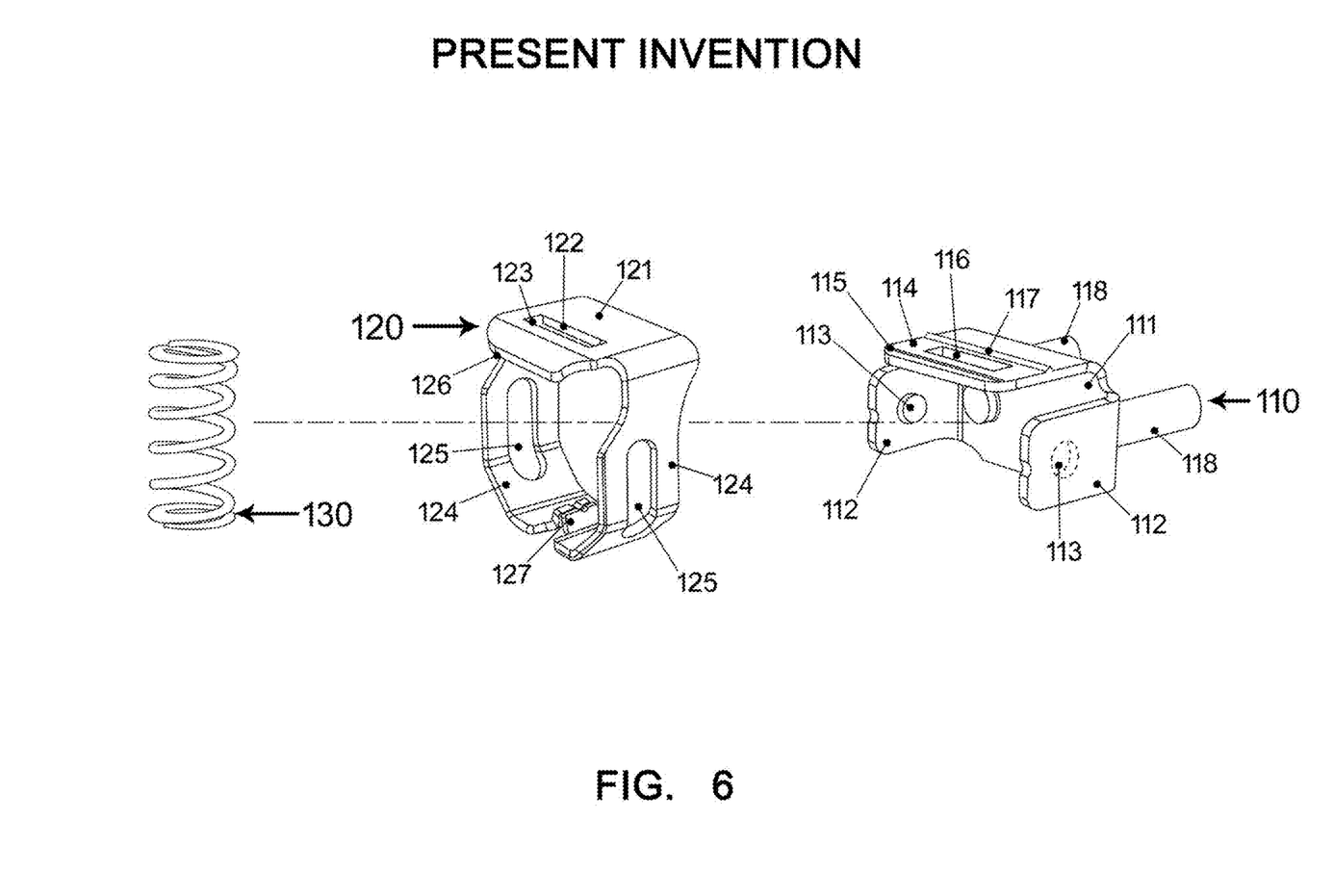
FIG. 6 is an exploded view of the present invention (hygienic conveying chain clamp), designed to show the three main components (1) stanchion, (2) gripper, (3) spring, and the location of each part forming said components, using the numbers outlined in the descriptive key; in accordance with an exemplary embodiment of the present invention.

The hygienic conveying chain clamp 100 is used for holding the packing film 401, which is conveyed between various work stations 403 of the food packaging machine 400. As shown in FIG. 6, the hygienic conveying chain clamp 100 comprises of three primary components: stanchion 110, gripper 120, and spring 130.

Figure 8:
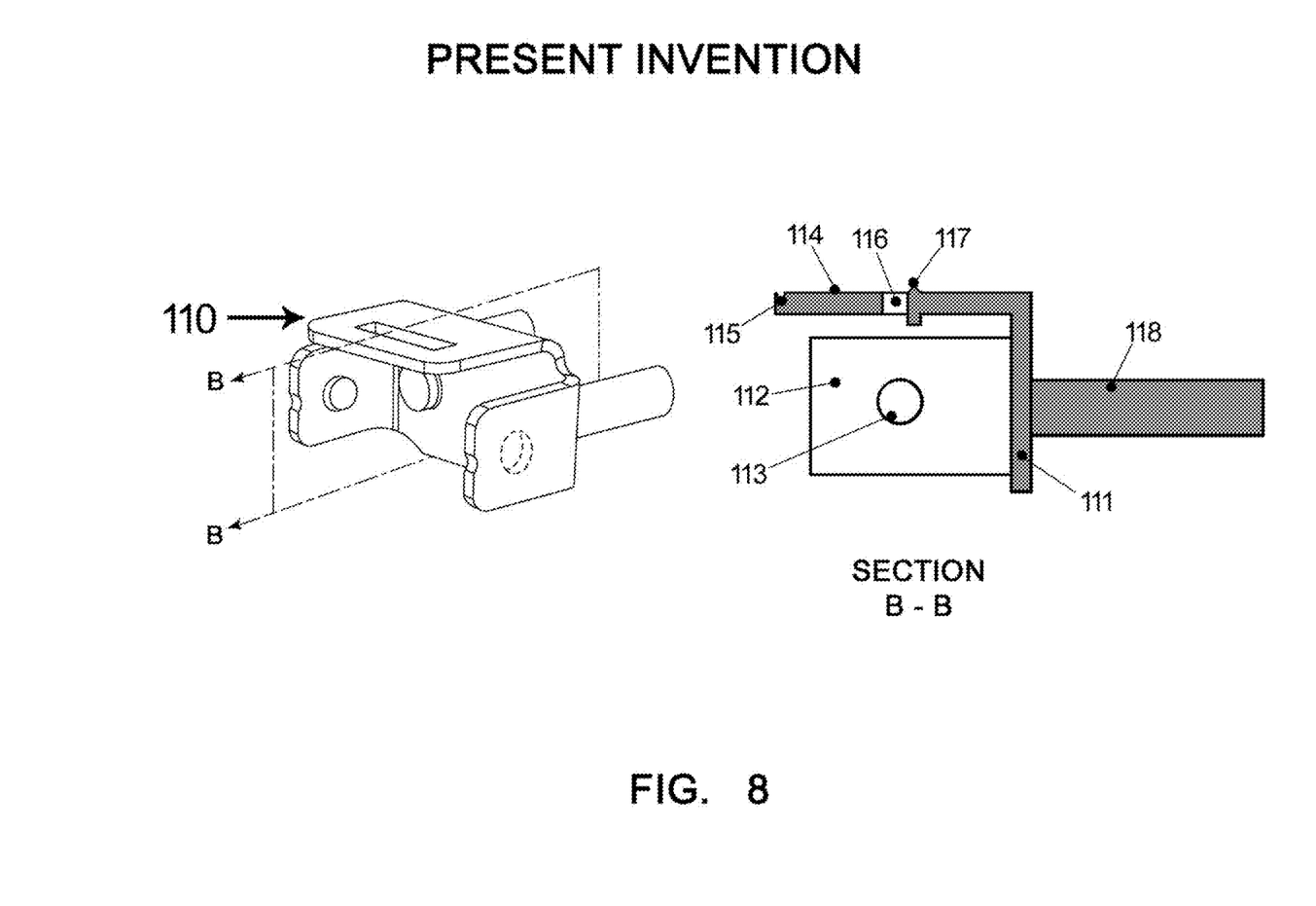
FIG. 8 shows a sectional view of the stanchion component (Section B-B), outlining, using the descriptive key, the positioning of the following parts forming said component: back wall, side wall, guide pin, skid surface, groove, mortise, ridge, and a dowel used for attaching the stanchion to the conveying chain; in accordance with an exemplary embodiment of the present invention.

As shown in FIGS. 6 and 8, the stanchion 110 comprises of the following parts: back wall 111, two side walls 112, two guide pins 113, skid surface 114, groove 115, mortise 116, ridge 117, and a plurality of dowels 118.

Figure 7:
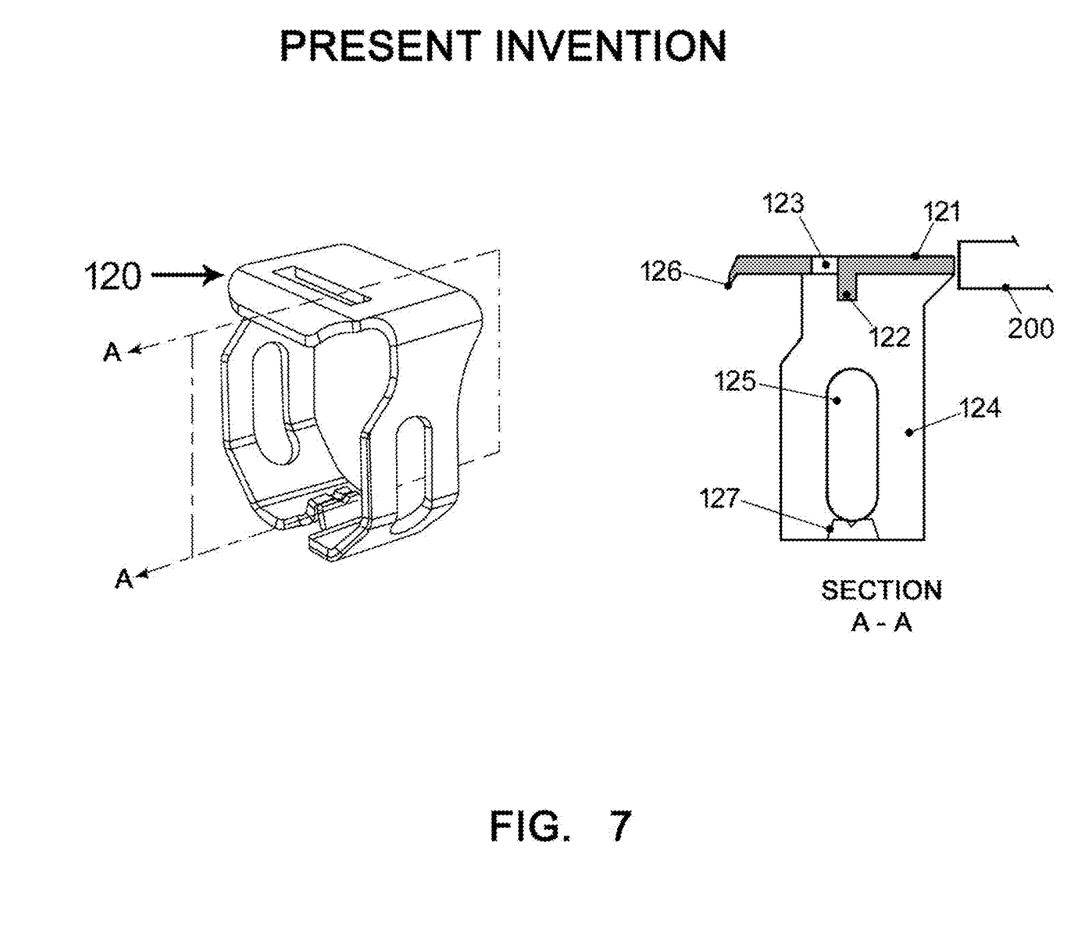
FIG. 7 shows a sectional view of the gripper component (Section A-A), outlining, using the descriptive key, the positioning of the following parts forming said component: top wall, tenon, tenon opening, guide wall, channel, clamp edge, spring tab, and the location of the activating member (stationary block) attached to the machine; in accordance with an exemplary embodiment of the present invention.

As shown in FIGS. 6 and 7, the gripper 120 comprises of the following parts: top wall 121, tenon 122, tenon opening 123, two guide walls 124, two channels 125, clamp edge 126, and spring tab 127.

The stanchion 110 is attached to the conveying chain 402 using a plurality of dowel pins 118. This connection method allows for quick detachment of the hygienic conveying chain clamp 100 from the conveying chain 402.

Figure 9:
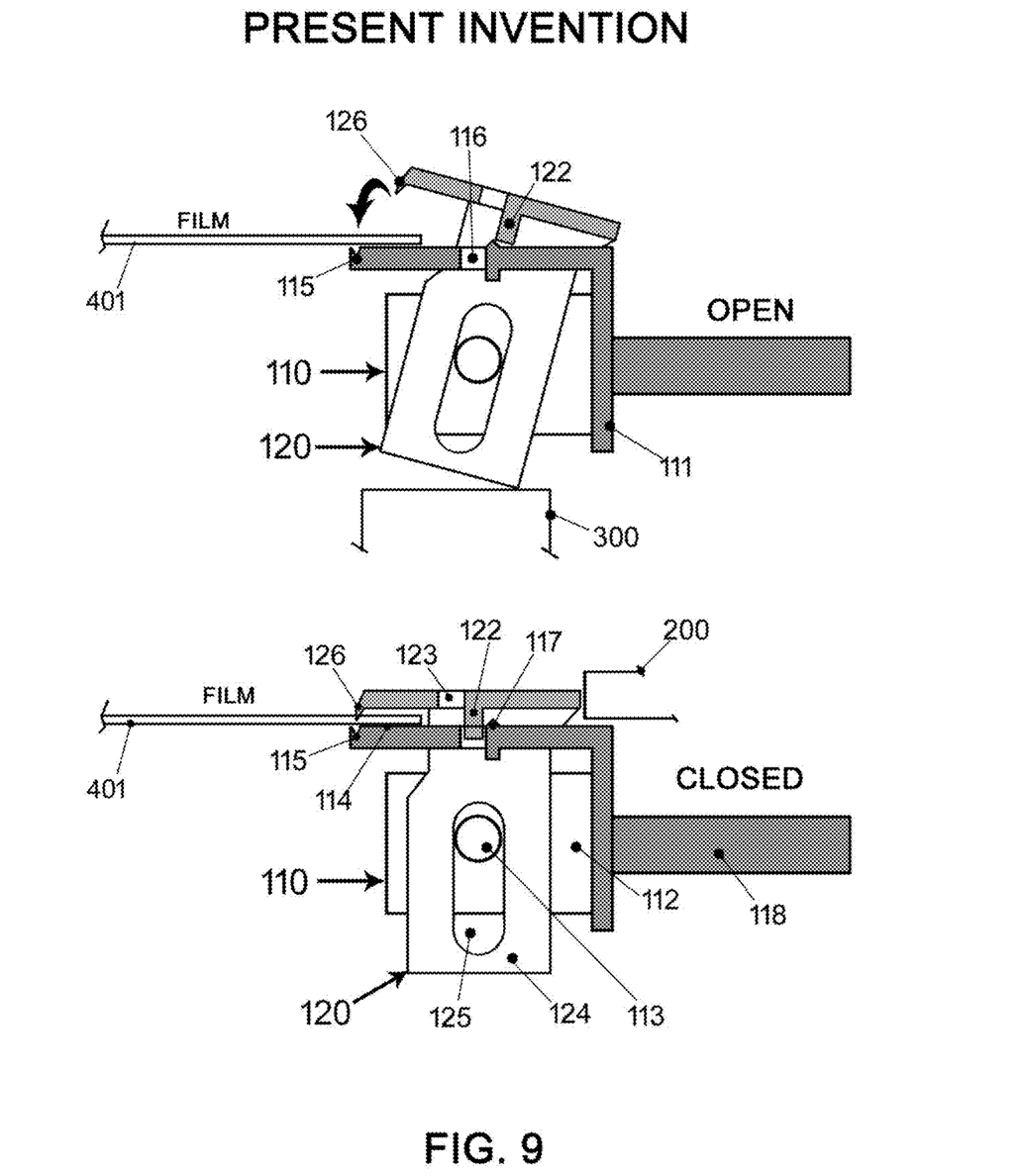
FIG. 9 shows a sectional view of clamp assembly (combining Sections A-A with B-B), and the positioning of the packaging film in relation to the main clamp components, namely the stanchion and the gripper, as well as the positioning of the cam, designed to open the clamp by engaging the gripper; in accordance with an exemplary embodiment of the present invention.

As shown in FIG. 9, the hygienic conveying chain clamp 100 opens when engaged by the cam 300 (independently mounted to the machine), causing vertical and pivotal movement of the gripper 120, allowing the packaging film 401 to access and slide over the skid surface 114 of the stanchion 110.

When the cam 300 is disengaged (no longer pushing the gripper 120 upwards), the tenon 122 will be butting against the ridge 117, thereby keeping the hygienic conveying chain clamp 100 in open position, until engaged by the activating member 200 (a block independently mounted to the machine), hits the gripper 120, causing the tenon 122 to jump over the ridge 117, and due to the spring's 130 pressure, enter the mortise 116, positioned in the stanchion 110 as shown in FIG. 9.

The mortise 116 to tenon 122 connection acts as a guide for the two interacting components, the stanchion 110 and the gripper 120. Specifically, the mortise/tenon connection is guiding the clamp edge 126 into the ridge 115, and by using the spring' tension, the packaging film 401 is clamped between the stanchion 110 and the gripper 120, enabling the conveying chain 402 to shuttle the packaging film 401 between the plurality of work stations 403 of the horizontal form fill and seal packaging machine 400.

I claim:

1. A hygienic conveying chain clamp used in a horizontal form fill and seal packaging machine, comprising:
   (A) a stanchion, having
      (a) a back wall,
      (b) two side walls,
      (c) two guide pins wherein each of said two side walls houses one of said two guide pins,
      (d) a skid surface used for slidably supporting a packaging film shuttled via a conveying chain of the horizontal form fill and seal packaging machine between a plurality of work stations;
   (B) a gripper, having
      (a) a top wall incorporating a tenon and a tenon opening,
      (b) two guide walls, (c) two channels, wherein each of said two guide walls houses one of the two channels,
(d) a clamp edge used for clamping the packaging film and thereby holding sandwiching the packaging film between the gripper and the stanchion;
(e) a spring tab;
(C) wherein said two guide pins are configured to slidably move inside the two channels, thereby enabling predetermined vertical and pivotal movement of the gripper;
(D) wherein said skid surface further comprises of
  (a) a groove, configured to mash with the clamp edge upon compressing the gripper against the stanchion thereby preventing slippage of the packaging film sandwiched between the skid surface and the clamp edge;
  (b) a mortise, configured to slidably house the tenon thereby guiding the clamp edge toward the groove;
  (c) a ridge, configured to make contact with the tenon thereby preventing closure of the gripper until engaged by an activating member;
(E) a spring, disposed on the spring tab, configured to releasably compress the gripper against the stanchion enabling clamping of the packaging film to the clamp edge thereby keeping the hygienic conveying chain clamp closed;
(F) wherein the hygienic conveying chain clamp remains closed until engaged by a cam fixedly-located at predetermined location on the horizontal form fill and seal packaging machine;
whereby the hygienic conveying chain clamp opens when engaged by the cam, causing vertical and pivotal movement of the gripper allowing the packaging film to access and slide over the skid surface, when the cam is disengaged, the tenon butting against the ridge keeps the hygienic conveying chain clamp open, until engaged by the activating member, enabling the tenon to jump over the ridge and enter the mortise, thereby guiding the clamp edge into the ridge, and by using spring-power the packaging film is clamped between the stanchion and the gripper, enabling the conveying chain to shuttle the packaging film between the plurality of work stations of the horizontal form fill and seal packaging machine.

2. The hygienic conveying chain clamp used in a horizontal form fill and seal packaging machine of claim 1, further comprising: a plurality of dowels configured to releasably attach the stanchion to the conveying chain.

3. The hygienic conveying chain clamp used in a horizontal form fill and seal packaging machine of claim 1, wherein: said activating member is a stationary block fixedly-located near the conveying chain.

4. The hygienic conveying chain clamp used in a horizontal form fill and seal packaging machine of claim 3, wherein said stationary block location is configured to close the hygienic conveying chain clamp at predetermined location.

5. The hygienic conveying chain clamp used in a horizontal form fill and seal packaging machine of claim 1, wherein: said tenon opening allows debris collected by the packaging film to fall through said the tenon opening thereby reducing buildup of bacteria between the stanchion and the gripper.

* * * * *